Oct. 19, 1954          F. D. SAWYER ET AL          2,691,932
                QUICK-ATTACHING TRACTOR IMPLEMENT HITCH
Filed Sept. 24, 1951                              4 Sheets-Sheet 1
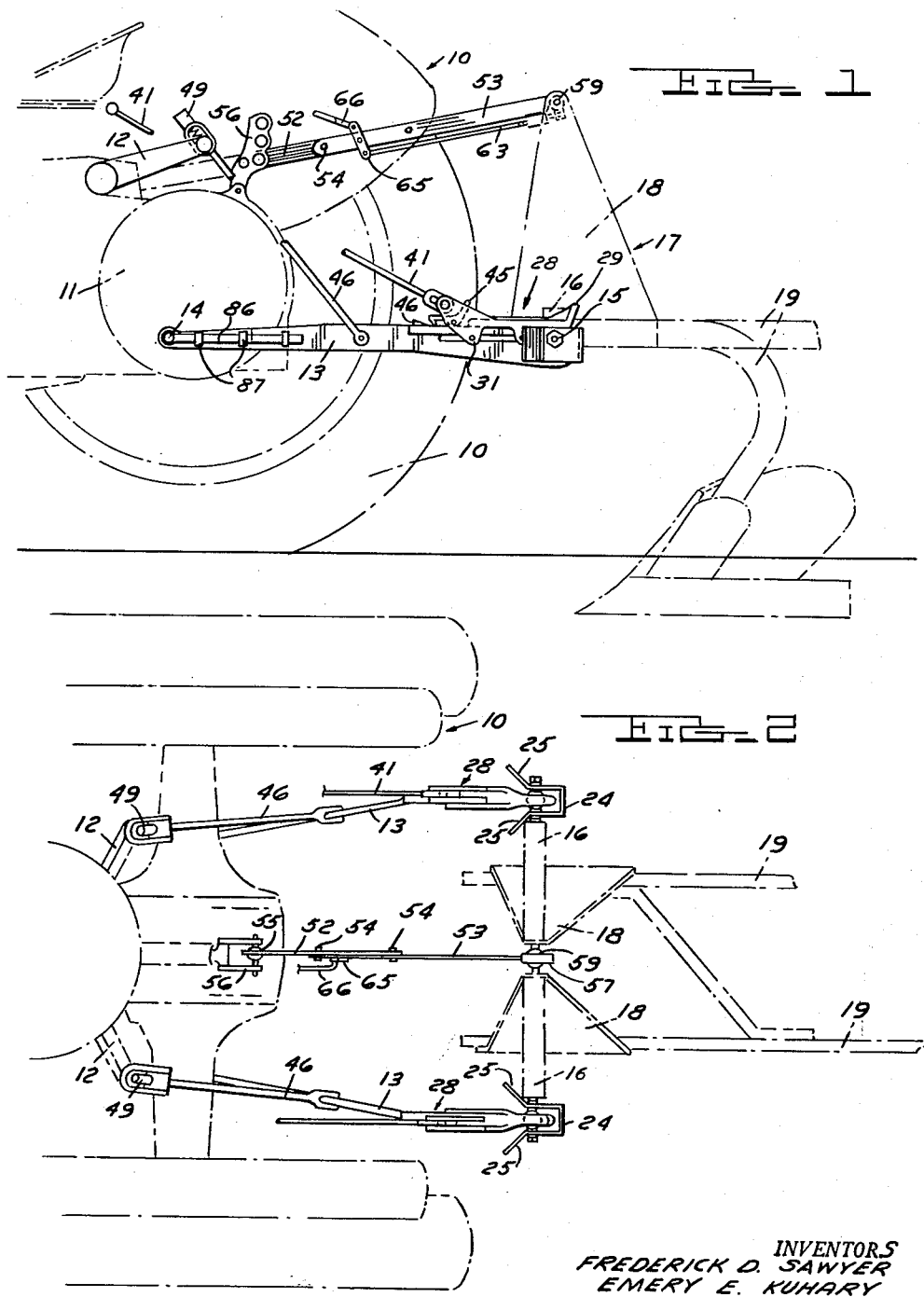
INVENTORS
FREDERICK D. SAWYER
EMERY E. KUHARY
BY
*W. A. Schaich*
ATTORNEY

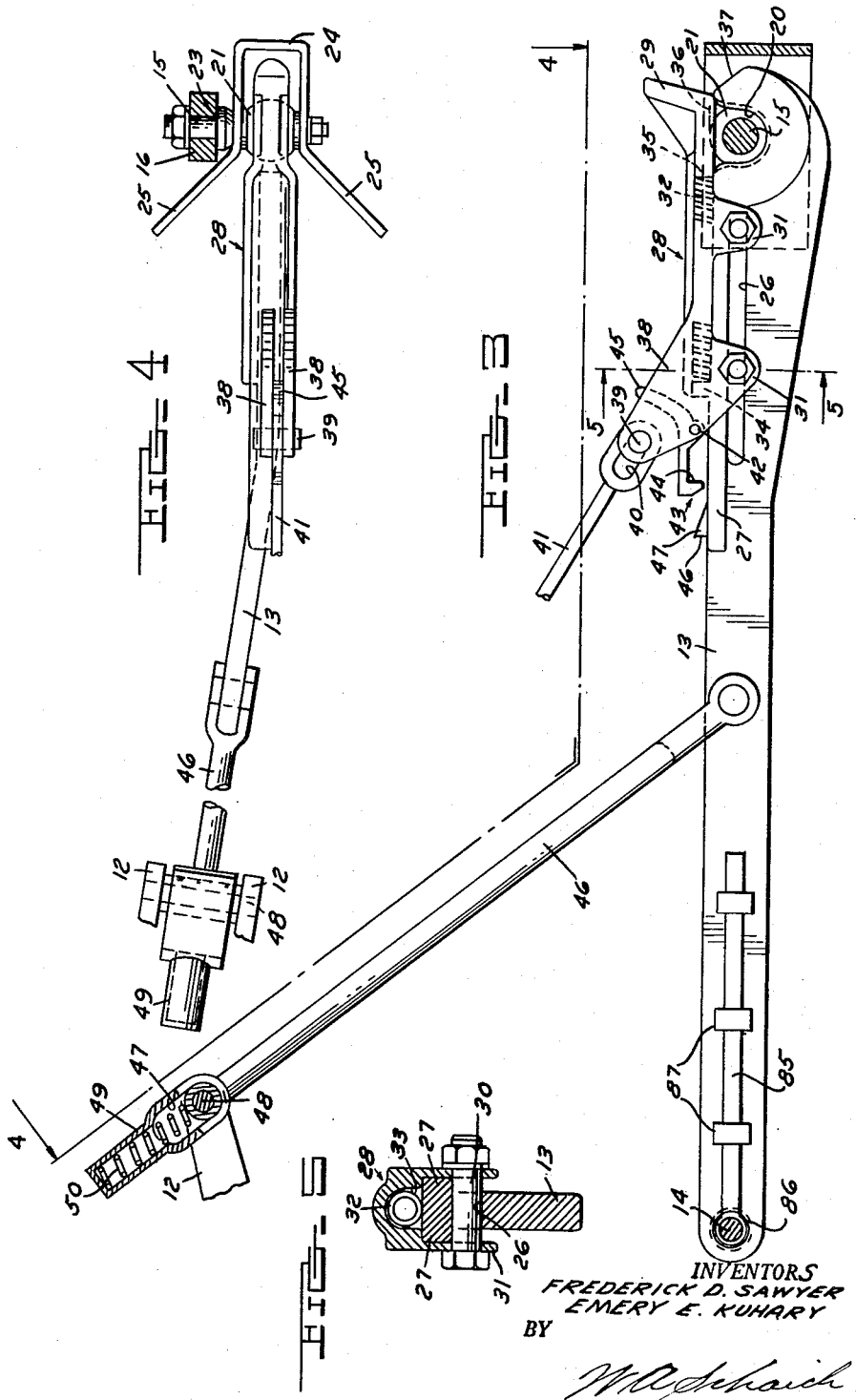

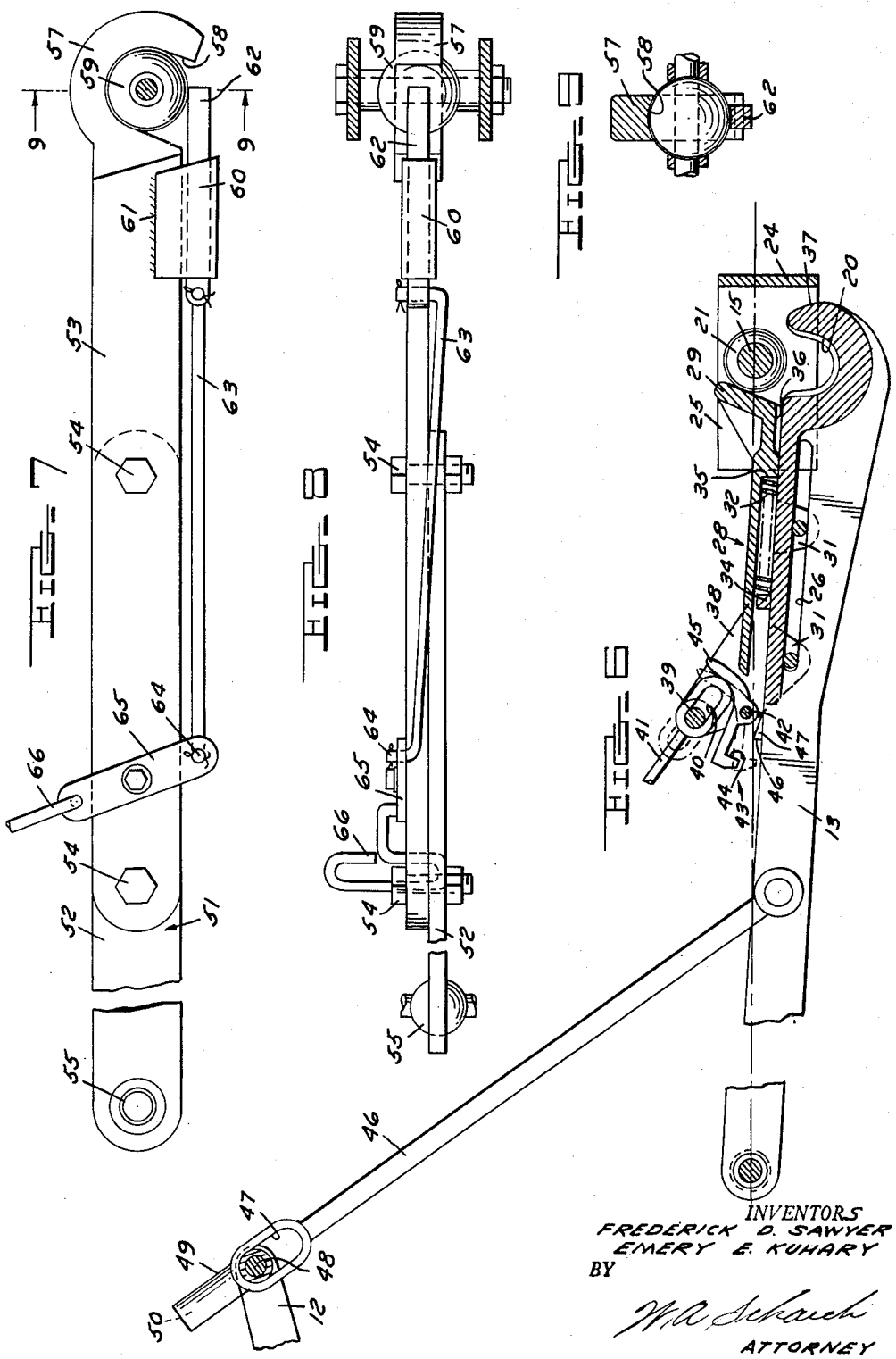

Oct. 19, 1954     F. D. SAWYER ET AL     2,691,932
QUICK-ATTACHING TRACTOR IMPLEMENT HITCH
Filed Sept. 24 1951     4 Sheets-Sheet 4
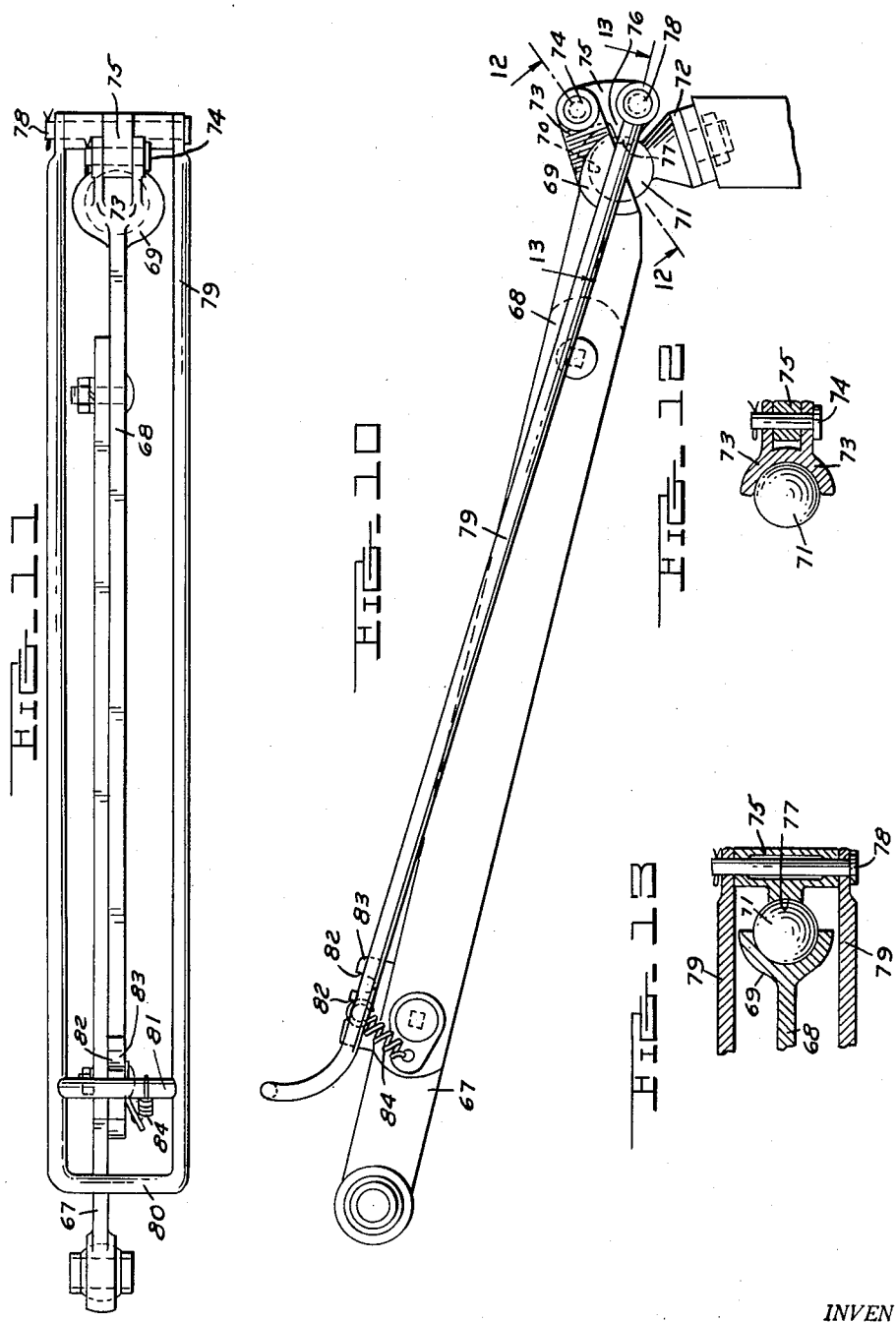
INVENTOR.
FREDERICK D. SAWYER
EMERY E. KUHARY
BY
ATTORNEY Patented Oct. 19, 1954

2,691,932

UNITED STATES PATENT OFFICE 2,691,932

QUICK-ATTACHING TRACTOR IMPLEMENT HITCH

Frederick D. Sawyer, Wayne, and Emery E. Kuhary, Royal Oak, Mich., assignors, by mesne assignments, to Ford Motor Company, Dearborn, Mich., a corporation of Delaware Application September 24, 1951, Serial No. 248,058

14 Claims. (Cl. 97—47.14)

The present invention relates to a quick-attaching tractor-implement hitch and more particularly to a hitch for expeditiously and conveniently attaching an implement to a tractor through a three-point linkage connection.

In certain types of tractors, a three-point tractor-implement connection is utilized for purposes of implement positioning control through a tractor-mounted and tractor-driven hydraulic system. The tractor-implement connection is accomplished by means of a tractor-mounted linkage including a pair of lower, laterally spaced, power-liftable, trailing hitch links and an upper, central, trailing top link subject to compression loads of varying magnitude during implement operation for controlling the positioning of the lower links through the tractor hydraulic system. In connecting the tractor to the implement by the usual practice, it is necessary for the operator to maneuver the tractor into accurate longitudinal and transverse alignment with the implement, to dismount the tractor, and to manually position the links upon the implement attachment points, followed by the insertion of linch pins or the like at the attachment points to secure the implement to the tractor. A similar but reversed procedure is followed to disconnect the implement.

The present invention provides an improved hitch wherein it is not necessary for the operator to dismount the tractor to either attach or detach the implement and wherein no manual manipulation of the linkage at the attaching points is required.

More specifically, the present invention utilizes ball and socket-type attachment means at each link-implement connection point, so that it is not necessary to employ linch pins or the like. Secondly, the ball and socket attachment means are remotely controllable, either manually or automatically and without the presence of the operator at the exact attachment point, so that it is not necessary for the operator to leave the tractor seat during either implement attachment or detachment. In addition, the attaching means are firmly locked, when attached, to insure tractor-implement co-movement, and the relative positioning of the tractor-carried attachment elements and the implement-carried attachment elements may be adjusted prior to and during attachment to insure accurate registry thereof.

It is, therefore, an important object of the present invention to provide an improved and convenient quick-attaching tractor-implement hitch.

Another object of this invention is the provision of a quick-attaching hitch wherein tractor-to-implement attachment is expeditiously accomplished without direct manual manipulation of the hitch at the points of attachment.

A further object is to provide a quick-attaching hitch for the three-point connection of an implement to a pair of lower tractor mounted power-liftable hitch links and to an upper tractor mounted hitch link without the necessity of manual manipulation at the connection points.

It is still another object to provide a tractor hitch having spaced remote-controlled lower and upper trailing links, each latchable onto correspondingly spaced implement attachment bearings through matingly engageable segmental spherical surfaces on the links and the implement.

Yet another object of this invention is the provision of a tractor hitch wherein attachment of the tractor to an implement is facilitated by cooperable ball and socket attaching means carried by the tractor links and the implement, the attaching means being brought into registry and actuated for attachment without the necessity of manual manipulation at the points of attachment.

It is a still further important object to provide an improved remotely controllable attachment means for securing and releasing an implement to triangularly arranged tractor hitch links, the attachment means including cooperable interengaging elements on the links and the implement, and means for aligning the elements during attachment thereof.

The specific nature of this invention, as well as other objects and advantages thereof, will become apparent to those skilled in the art from the following detailed description, taken in conjunction with several sheets of drawings on which, by way of preferred example only, is illustrated two embodiments of this invention.

On the drawings:

Figure 1 is a side elevational view of a tractor provided with the quick-attaching linkage of the present invention, one rear wheel of the tractor being removed for clarity of illustration;

Figure 2 is a plan view of the tractor and linkage of Figure 1;

Figure 3 is an enlarged elevational view of the linkage alone with parts broken away and in section;

Figure 4 is a view taken along the planes 4—4 of Figure 3;

Figure 5 is a sectional view, with parts shown in elevation, taken along the plane 5—5 of Figure 3;

Figure 6 is a view similar to Figure 3 illustrating the linkage in an adjusted position assumed during attachment;

Figure 7 is an elevational view of the linkage top link;

Figure 8 is a plan view of the link of Figure 7;

Figure 9 is a sectional view, with parts shown in elevation, taken along the plane 9—9 of Figure 7;

Figure 10 is a side elevational view of a modified form of top link;

Figure 11 is a plan view of the top link of Figure 10;

Figure 12 is a fragmentary sectional view, with parts shown in elevation, taken along the plane 12—12 of Figure 10;

Figure 13 is a fragmentary sectional view, with parts shown in elevation, taken along the plane 13—13 of Figure 10.

As shown on the drawings:

In Figures 1 and 2, reference numeral 10 refers generally to a tractor of well-known make, such as a Ford tractor, provided with a transversely extending rear axle housing 11 and a pair of transversely spaced, power-liftable rock arms 12 immediately above and slightly in advance of the tractor rear axle housing. As is well-known in this type of tractor, the tractor is provided with an hydraulic actuating mechanism which is operable to elevate the rock arms 12 so that implements attached to the tractor may be power-lifted.

Mounted at a forwardly located underportion of the housing 11 are a pair of trailing, laterally spaced, forwardly convergent draft links 13. The links are pivoted at their forward ends, as at 14, by a ball type connection to the tractor rear axle housing and the rear ends of the lower links are pivoted, as by pins 15, to a cross shaft 16 of an implement 17, such as a plow, the plow 17 being provided with an upwardly extending A-frame 18 which is rigid with the plow beams 19, as is well-known in the art. The extreme trailing ends of the draft links 13 are slightly deflected from their normally forwardly convergent contour, and the rearward ends thereof are provided with open topped notches 20 (Figures 3 and 6). The inner surfaces of the notches are dished, so as to present a segmental spherical inner surface adapted to receive thereagainst in mating relation a spherical attachment bearing 21 mounted on the mounting pin 15 projecting laterally from the implement cross shaft 16. The spherical bearing 21 is spaced from the cross shaft by a spacer element 23 and a guide member 24 having laterally outwardly divergent, forwardly extending lips 25 is also secured on the pin to laterally enclose the bearing, as best shown in Figure 4. A modified form of implement hitch guide is disclosed in the pending application of Frederick D. Sawyer, Serial No. 248,055, now Patent Number 2,673,507, filed on even date herewith and assigned to the assignee of the present invention.

The rear portions of the links 13 are longitudinally slotted, as at 26, in advance of the notches 20 and the slotted portions 26 are surmounted by laterally projecting slide shoulders 27 formed integrally with the link (Figures 3 and 5). A slidable latch cover 28 having an upwardly projecting rear terminal lip 29 is adapted to slide along the upper surface of the slide shoulders 27, the slide being guided for such movement by transversely extending slide bolts 30 projecting laterally through the slot 26 and carried by integrally formed downturned ears 31 on the slide. Thus it will be seen that the slide is adapted for longitudinal sliding movement relative to the link 13, and the rear extremity of the slide normally overlies the notch 20.

The slide 28 is urged rearwardly by a compression spring 32 positioned within an open bottomed groove 33 (Figure 5) formed in the slide, the spring being bottomed against an upwardly extending projection 34 formed on the links and against an interior shoulder 35 at the end of the slide groove 33. The undersurface of the slide directly underlying the upturned flange 29 is cut away, as at 36, to provide a segmental spherical surface complementary to the bearing 21 and adapted to engage the bearing when the slide is in its rearmost position. It will be noted that the upturned flange 29 of the slide is slightly inclined rearwardly and upwardly with respect to a vertical plane and the extreme rear edge of the link 13 is upwardly and forwardly inclined, as at 37, so that the flange and the surface 37 cooperate to define a generally V-shaped guiding notch for a purpose to be hereinafter more fully described.

The slide 28 is also provided at its forward end with a pair of upwardly and forwardly projecting ears 38 having a transversely extending pin 39 carried at the forwardmost portions thereof. This pin 39 is received by a slot 40 provided at the extreme rear end of an actuating arm 41 which extends upwardly and forwardly to a position directly behind the operators station of the tractor 10 (Figure 1). The upwardly projecting ears 38 also receive a lower transversely extending pin 42 extending therebetween and pivotally supporting a locking dog 43. The dog 43 is provided with an undercut locking shoulder 44 and with a curved upwardly and rearwardly projecting release extension 45 disposed on opposing sides of the pivot pin 42. The dog shoulder 44 is adapted to receive a complementary shoulder 46 provided by a stop 47 projecting upwardly above the link 13.

From the foregoing description it will be appreciated that push-pull movement of the actuating arm 41 will cause corresponding longitudinal reciprocating movement of the slide 28. Forward movement of the slide must be accomplished against the compressive resistance of the spring 32, and the spring will serve to urge the slide rearwardly to its position of Figure 3, i. e., overlying the notch 20 and the bearing 21 when the same is positioned therein. In this rearwardmost position, the transverse pin 39 is at the rear of the slot 40 and the dog 43 is displaced rearwardly of the projection 47. Upon forward movement of the slide 28, as upon pulling the arm 41, the pin 39 remains at the rear of the slot 40, but the undercut dog shoulder 44 engages the shoulder 46 of the stop 47 to retain the slide in its open position with the slot 20 uncovered. This forward position of the slide is illustrated in Figure 6 with the dog normally occupying its dotted position when the slide is retained in a forward position. Actually, the slide is movable to an extreme forward position at which the dog shoulder 44 is vertically aligned with but in advance of the stop shoulder 46 so that engagement of the dog and the stop are obtained only upon manual release of the arm 41. To manually release the slide from its forward position, it is only necessary to push rearwardly on the actuating rod 41 with free rearward movement of the arm (due to movement of the pin 39 in the slot 40) accommodating movement of the slot 40 relative to the pin 39 so that the extreme rear end of the arm contacts the dog extension 45, forcing the same downwardly and rearwardly so that the dog is pivoted about the pin 42, thus raising the shoulder 44 sufficiently to clear the stop shoulder 46, as illustrated in full lines in Figure 6.

The slide may also be moved forwardly by contact with the bearing 21 with the rear flange 29 of the slide. This contact may be readily obtained by merely backing the tractor toward the implement until the bearing contacts the shoulder with the guide surface 37 aiding to guide the same into such contact. Upon further movement of the tractor after contact has been established, the slide is moved forwardly against the action of the spring 32 to uncover the slot 28 and elevation of the links will then cause the bearing to drop into the notch. During hitching in this manner, the arm 41 is not moved manually, and forward movement of the slide relative thereto will move the pin 39 forwardly in the slot 40. Thus, the extreme end of the actuating rod contacts the dog extension 45 retaining the dog shoulder in elevated position to prevent locking of the slide in its forward position.

To eliminate the necessity of manually actuating the tractor hydraulic system to elevate the links 13 once the position of Figure 6 has been attained, the lift arms 46 normally provided for connecting the hitch links 13 to the rock arms 12 are modified, so that the upper portion of the lift arms are provided with an interior slot 47 within which a connecting pin 48 carried by the rock arms 12 is freely movable. The slot 48 is surmounted by an integrally formed spring chamber 49 longitudinally aligned with the arm 46 and housing a spring 50 (Figure 3). The spring 50 is bottomed between the end of the housing 49 and the pin 48, and vertical movement of the lift arm 46 relative to the rock arm 12 is accommodated by the spring. The utility of the spring 50 is illustrated in Figure 6. Upon backing the hitch links into contact with the bearing 21 the links will be depressed against the action of the springs 50 so long as the bearing 21 contacts the links. This depression of the links compresses the spring 50 and when the bearing 21 is positioned over the slot 28 so as to contact only the slide 28, the compressive strength of the spring raises the link so that the bearing enters the notch. Thus, Figure 6 represents the position of the bearing and the link elements in their instantaneous position immediately prior to elevation of the links to enter the bearing within the notch.

As is well-known, both hitch links 13 are free to swing laterally about their ball type connections 14 to the tractor. In order to insure lateral alignment of the notches 20 with the attachment bearings 21, leaf springs 85 illustrated in Figures 1 and 3 are utilized. The spring is apertured at its forward end, as at 86, to receive the bolt 14 therethrough, and the rear portions of the spring extend alongside the associated link element 13 to lie thereagainst. The springs tend to resiliently hold the adjacent elements 13 in parallel alignment since spring retaining slides 87 carried by the links are provided along the spring length, so that lateral movement of the link elements 13 in either direction will tension the springs to bias the elements to a central position.

In Figures 7, 8 and 9, there is illustrated a top link connection which is particularly adapted for use with the lower laterally spaced links as hereinbefore described. This top link is indicated generally by reference numeral 51 and includes separable link sections 52 and 53 secured together by suitable means, as by nuts and bolts 54. The use of a sectioned link makes possible the changing of the link length to accommodate varying types of implements and varying conditions under which the implements are utilized.

The forward link connection is provided at its free end with a segmental spherical joint 55 which is received by an upstanding connecting link 56 surmounting the tractor rear axle, as is well-known in the art. The rear link section 53 terminates in an enlarged boss 57 having an open bottomed, generally U-shaped notch 58 formed therein, the inner wall of the notch being contoured, as best shown in Figure 9, to provide a segmental semi-spherical surface. The notch is adapted to receive therein an attachment bearing 59 generally similar to the bearings 21 hereinbefore described and carried by the implement A-frame 18 adjacent the upper extremity thereof.

Adjacent the boss 57, the link section 53 is provided with a generally U-shaped bracket 60 attached, as by welding indicated at 61, to the link section to depend therefrom. The bracket 60 slidably receives a locking slide 62 which is pivotally attached to a link 63 extending longitudinally of the link 51 and pivotally attached at one end, as at 64, to a medially pivoted crank arm 65. The upper end of the crank arm has an actuating handle 66 attached thereto and it will be seen that forward and rearward movement of the handle 66 will cause corresponding movement of the crank arm 65, thereby effecting reciprocation of the slide 62 into and out of its illustrated position underlying the notch 58.

In attaching an implement to a tractor provided with the top link 51, it is only necessary to grasp the handle 66 and push the same rearwardly to retract the slide 62 from its position under the notch 58, followed by elevation of the link and lowering the same so that the bearing 59 is received by the notch. After the bearing has been inserted in the notch, it is only necessary to pull the handle 66 forwardly to move the slide into its locking position illustrated in Figures 7 and 8.

In the modified type of top link illustrated in Figures 10–12, inclusive, the front link section 67 is substantially identical with the section 52 hereinbefore described, while the rear link section 68 is provided with a freely extending rear end terminating in a concavo-convex bonnet 69 having a concave undersurface 70 of semi-spherical contour adapted to matingly abut a bearing 71 carried by the top of the A-frame 18. In this instance, the bearing 71 is secured to the A-frame through a pedestal 72, so that the bearing projects upwardly and forwardly from the A-frame in a fully exposed position. The bonnet 69 is surmounted by an upstanding rearwardly projecting clevis 73, the arms of which are apertured at their extreme rear ends to receive a pivot pin 74 therethrough. Intermediate the clevis arms and pivotally disposed on the pin 74 is a depending link arm 75 terminating in a lower inwardly directed boss 76 having a concave terminal surface 77. The surface 77 is adapted to contact the surface of the bearing 71 in opposed relation to the bonnet surface 70.

The rearward extreme portion of the link arm 75 is pivoted by means of a pin 78 to a pair of laterally spaced forwardly extending actuating arms 79. The arms 79 are joined at their forward extremities and extend upwardly so that the joining portion 80 forms a handle. Adjacent the forward end of the arms 79 and fixed thereto to project therebetween is a locking bar 81 which is adapted to be received in longitudinally spaced notches 82 formed in a locking plate 83 fixedly secured to the top link section 68. The locking bar 81 is retained within a selected one of the notches 82 by a tension spring 84 having one end attached to the bar and the other end attached to the link section 68.

To attach the top link of Figures 10-13 to the bearing 71, the arms 79 are actuated rearwardly to position the bar 81 in the rearmost notch 82. This rearward actuation spaces the surfaces 76 and 77 through a distance greater than the diameter of the bearing. The link may now be lowered onto the bearing so that the bearing contacts the undersurface 76. To lock the bearing in position against the bonnet surface 70, the arms 79 are actuated forwardly to pivot the link 75 relative to the link section 68, so that the surface 77 of the link contacts the bearing in opposed relation to the bonnet surface 70. When the link is actuated to this position, the locking bar 81 may be dropped into the notch 82 so that the top link is securely attached to the bearing. The spring 84 serves to retain the locking bar 81 in the selected one of the notches 82.

Thus, it will be seen that the present invention provides an improved quick attaching and detaching tractor-implement hitch of the three point connection type, each connection of the hitch to the implement is accomplished through ball and socket type joints so that the implement and hitch are firmly assembled without interference with relative lateral and vertical movement of the implement. This freedom of pivoting movement of the implement relative to the linkage is of utmost importance in preserving the desired characteristics of the three point connection, so that the implement may be moved vertically into operating and/or transport position and so that the lateral steering characteristics of the forwardly converging lower links may be preserved. In addition to the advantage of freedom of implement movement relative to the linkage, the implement may be attached to the links and detached therefrom without the necessity of manual manipulation of either the linkage or the implement at the connection points.

It will, of course, be understood that various details of construction may be varied through a wide range without departing from the principles of this invention and it is, therefore, not the purpose to limit the patent granted hereon otherwise than necessitated by the scope of the appended claims.

We claim:

1. An implement hitch for attaching an implement to a tractor comprising a pair of laterally spaced trailing hitch links carried by the tractor for relative lateral and vertical movement, latching means at the free rear end of said elements for attaching the same to correspondingly spaced attachment points on the implement, and means resiliently opposing lateral movement of said links to insure alignment thereof with said attachment points, said last mentioned means including a leaf spring element extending longitudinally of each of said link elements and means on said link elements retaining said leaf spring thereagainst.

2. An implement hitch for attaching an implement to a tractor comprising a pair of laterally spaced trailing hitch links on the tractor, means at the trailing end of each of said links defining an interior socket, longitudinally slidable latches carried by said elements and movable thereon to overlie said sockets, resilient means urging said latches to a position overlying said sockets, and holding means on said latches engaging an adjacent portion of said link element to retain said latch against sliding movement under the influence of said spring.

3. An implement hitch for attaching an implement to a tractor comprising a link element carried by the tractor and having an open topped notch formed at the free rear end thereof, a longitudinally slidable latch carried by said link and adapted to overlie said notch, a spring confined between said latch and said link for urging said latch to a closed position overlying said notch, manual means for retracting said latch against the action of said spring, a pivoted holding dog carried by the latch and engageable with the link to retain the latch in its open position, and means responsive to limited free movement of said manual means for unlocking said holding means to allow said spring to urge said latch to its closed position.

4. An implement hitch for attaching an implement to a tractor comprising a trailing hitch link carried by said tractor and having an open notch at the free rear end thereof adapted to receive an implement attachment bearing therein, a latch reciprocably movable longitudinally of said link to selectively open and close said notch, a spring normally urging said latch to closed position, a holding dog on said latch normally engageable with the link to retain said latch in open position, said latch being urged to open position against said spring upon contact of the latch with the attachment bearing, and means preventing the engagement of said dog with said link when said latch is open by such engagement.

5. An implement hitch for attaching an implement to a tractor comprising a pair of power-liftable rock arms on said tractor, a pair of trailing links on said tractor having open notches at the rear ends thereof, longitudinally slidable latches on said links for normally overlying said notches, lift arms connecting said links to said rock arms, and means providing a lost motion connection between said rock arms and said lift arms to accommodate limited relative vertical movement between said rock arms and said links.

6. In an implement hitch for attaching an implement to a tractor, trailing hitch links on said tractor having means at the free ends thereof for attaching the same to an implement, power-liftable rock arms on said tractor generally overlying said links, a lift arm pivotally attached to each of said links respectively and extending thereabove to said rock arms, pin and slot connections between said rock arms and said lift arms to accommodate limited free relative movement therebetween, and springs acting on said connections to resist said relative movement.

7. In an implement hitch for attaching an implement to a tractor, a pair of laterally spaced trailing lower links, latch means at the trailing extremities of said lower links for engaging said implement to secure said implement thereto, an elongated upper link arm projecting rearwardly from said tractor and having an open sided notch at the extreme rear end thereof, said notch being adapted to receive therein an implement attachment bearing spaced from the point of attachment of said latch means to said implement, a reciprocable latch element carried by said link, and a medially pivoted arm carried by said link arm and having one end operatively connected to said latch element and the other end manually operable to effect reciprocation of said latch element.

8. In an implement hitch for attaching an implement to a tractor, a pair of laterally spaced lower link elements, means on the trailing ends of said elements latchably engageable with attachment bearings on the implement, an elongated top link arm having its forward end pivotally attachable to the tractor and its rear end having an open sided notch, and a manually actuatable latch plate guided for reciprocable movement relative to said link arm to selectively open and close the open side of said notch.

9. In an implement hitch for attaching an implement to a tractor, a pair of trailing lower link elements, means at the trailing ends of said elements latchably engageable with attachment bearings on said implement, an elongated top link arm connected at one end to the tractor above and laterally intermediate said link elements to project rearwardly therefrom, a bonnet rigidly attached to said link arm and having a concave undersurface adapted to receive an attachment bearing thereagainst, a locking arm pivoted to said link arm and movable relative thereto to engage a portion of said attachment bearing spaced from that portion engaging said bonnet, and a manually actuatable lever arm connected to said locking arm to effect movement of the same.

10. An implement hitch for attaching an implement to a tractor comprising a pair of laterally spaced trailing hitch link elements having open topped notches at the rear ends thereof, a slidable cover adapted to overlie said notches, means for actuating said cover, an attachment bearing on said implement adapted for insertion into said notches, and guide means adjacent said attachment bearings and having forwardly divergent portions for guiding said elements into proximity with said bearing.

11. An implement hitch for a tractor comprising laterally spaced rigid attachment bearings on the implement, correspondingly laterally spaced trailing hitch links carried by the tractor and having open topped sockets adjacent the rear ends thereof to receive said bearings therein, slidable latches on said links for closing said sockets, latch springs urging said latches into closed position, and substantially vertically extending abutment surfaces on said latches adapted to receive said bearings thereagainst, contact of said bearings with said latches forcing said latches to an open position to accommodate entry of said bearings into said sockets.

12. An implement hitch for a tractor comprising laterally spaced rigid attachment bearings on the implement, correspondingly laterally spaced trailing hitch links carried by the tractor and having open topped sockets adjacent the rear ends thereof to receive said bearings therein, power-liftable rock arms on said tractor, lift arms joining said rock arms to said links, spring means accommodating limited movement of said links relative to said rock arms, slidable latches on said links for closing said sockets, latch springs urging said latches into closed position, and inclined abutment surfaces on said latches adapted to receive said bearings thereagainst, contact of said bearings with said latches forcing said latches to an open position and depressing said links relative to said rock arms by loading said spring means to accommodate entry of said bearings into said sockets with subsequent release of the load on said spring means positioning said bearings in said sockets, thereby said latch springs can urge said latches to closed position.

13. In an implement hitch for tractors including a pair of spaced power-liftable trailing hitch links and correspondingly spaced attachment bearings on an implement, latch means on said hitches including reciprocal latches adapted to engage said bearings, spring means normally urging said latches into engagement therewith, manually actuatable release arms for moving said latches in one direction from such engagement and having limited free movement in the opposite direction, and pivoted catch levers engageable with said links to retain said latches from engagement and releasable upon said free movement of said release arms to accommodate spring actuation of said latches into engagement with said bearings.

14. An implement hitch for attaching an implement to a tractor comprising a pair of laterally spaced trailing hitch links universally pivoted to the tractor, automatically engageable coupling means at the trailing ends of said links, laterally spaced connection means on said implement adapted to be engaged by said connection means, power-lift means on said tractor for elevating and lowering said hitch links to vertically align said coupling means with said connection means, and resilient means for retaining the trailing ends of said links in lateral alignment with said connection means while accommodating limited lateral movement thereof, whereby accurate registry of said coupling means and said connection means upon juxtaposition thereof is insured.

References Cited in the file of this patent

UNITED STATES PATENTS

| Number | Name | Date |
| --- | --- | --- |
| 2,118,181 | Ferguson | May 24, 1938 |
| 2,356,231 | Ferguson | Aug. 22, 1944 |
| 2,375,970 | Williams, Jr. | May 15, 1945 |
| 2,430,728 | Mott | Nov. 11, 1947 |
| 2,495,928 | Geraldson | Jan. 31, 1950 |